US005563353A

United States Patent [19]

Ferri

[11] Patent Number: 5,563,353
[45] Date of Patent: Oct. 8, 1996

[54] SOFTWARE NULLIFICATION OF TRANSDUCER INDUCED OFFSET ERRORS WITHIN A FLOW RATE MEASUREMENT SYSTEM

[75] Inventor: Vincent Ferri, Pittsburgh, Pa.

[73] Assignee: Westinghouse Air Brake Company, Wilmerding, Pa.

[21] Appl. No.: 376,823

[22] Filed: Jan. 23, 1995

[51] Int. Cl.6 .................................................. G01F 1/38
[52] U.S. Cl. ........................................ 73/861.48; 305/15
[58] Field of Search ........................... 73/861.48; 303/15, 303/3

[56] References Cited

U.S. PATENT DOCUMENTS

| 4,384,492 | 5/1983 | Kreuter | 73/861.48 |
|---|---|---|---|
| 4,533,185 | 8/1985 | Krause | 303/3 |
| 4,533,723 | 11/1985 | Nichols et al. | 246/167 |
| 4,654,813 | 3/1987 | Edlund et al. | 73/861.48 |
| 4,685,750 | 11/1987 | Imanaka | 303/15 |
| 4,904,027 | 2/1990 | Skantar et al. | 303/15 |
| 4,996,886 | 3/1991 | Hardin | 73/861.48 |
| 5,192,118 | 3/1993 | Balukin et al. | 303/15 |
| 5,222,788 | 6/1993 | Dimsa et al. | 303/15 |

Primary Examiner—Richard Chilcot
Assistant Examiner—Jewel V. Artis
Attorney, Agent, or Firm—James Ray & Associates

[57] ABSTRACT

Fluid flow in a conduit is measured by placing a flow block in the conduit which introduces variations in the flowpath which cause local pressure variations. The pressure variations are converted to electrical signals by transducers, and the electrical signals are processed to obtain flow rate values. To provide a correction for transducer drift, the transducer signals are examined during a time when there is known to be zero flow in the conduit. The difference between the transducer signals during a time when there is zero flow is used as a measure of transducer drift. A value for the drift is stored in computer memory and used subsequently, when fluid flow is resumed. This invention is specifically intended for use in railroad airbrake systems, where it is used in a locomotive to provide an accurate and reliable measurement of air supplied to the brake pipe of the air brake system.

20 Claims, 3 Drawing Sheets

SOFTWARE NULLIFICATION OF TRANSDUCER INDUCED OFFSET ERRORS WITHIN A FLOW RATE MEASUREMENT SYSTEM

FIELD OF THE INVENTION

This invention applies to the measurement of fluid flow in a pipe or other conduit, and most particularly applies to measurement of airflow in railroad airbrake systems. The invention provides apparatus and method for correcting for errors in the measurement of the flow of air or other fluid caused by drift of transducers used to convert fluid pressure information into electrical signals. Most particularly, the invention provides improved accuracy and reliability in the detection and measurement of charging air supplied to the brake pipe of a locomotive.

BACKGROUND OF THE INVENTION

In the classical railroad air brake system, as developed from the Westinghouse air brake, the brake air line which passes from the locomotive and then from car to car down the length of the train, provides two basic functions.

First, it is used to charge compressed air tanks in the railroad cars. The air stored in these tanks provides the energy needed to apply the brake shoes when a brake application is required. When the train is running normally, and no brake application is needed, a high pressure in the range from 70 to 110 pounds exists in the brake air line. The tanks in the cars are charged to the same pressure as the air in the brake air line.

Second, when a brake application is required, air is exhausted from the brake air line, causing the pressure in the brake air line to be reduced. In the cars of the train, this reduction of pressure is used as a signal to apply the brakes. In this event, valving in the cars utilizes the compressed air in the tanks to apply pressure to the brake shoes so that the brakes are applied.

After a train has been stopped by an application of the air brakes, the air pressure in the tanks on the cars of the train is depleted. In order for the train to operate safely, the engineer must wait until the tanks are recharged before he puts the train in motion.

In order for the engineer to know when the tanks are charged, a flow meter is used to indicate the flow rate of air from a compressor and reservoir in the locomotive to the brake pipe in the locomotive. When this flow stops, the engineer knows that the tanks in the cars are fully charged, and that it is safe to proceed.

In the prior art system, an orifice is built into the line which supplies air to the main valve which supplies air to the brakepipe in the locomotive. Two pressure transducers are used to measure pressures which can be used to calculate the air flow. One tap is generally upstream of the orifice. Another tap may be in the restricted portion of the orifice.

The difference between these signals is calculated in a computer, which also takes the square root of the difference, and multiplies by a constant, to obtain the flow rate.

This system has the disadvantage that if one or both of the transducers drift, providing a reading not in accordance with its calibration, then a false value will be computed for the airflow. This can be a very dangerous condition, because if a finite airflow rate is read as being zero, the engineer may believe that it is safe to put the train in motion when, in fact, it is not.

The system is quite sensitive to errors caused by drift of the transducers because the step of subtracting one transducer signal from the other causes percentage errors greater than the errors in either transducer separately.

In order to prevent such errors, in the prior art system, regularly-scheduled maintenance is necessary for the transducers. A known pressure is applied to the line which the transducers monitor, with zero airflow in the line. The transducers are then adjusted to give exact readings of the pressure by adjusting potentiometers on them.

This procedure has the disadvantages that it is labor intensive, and that errors may accumulate during the entire period between maintenance checks.

To provide additional information on railroad airbrake systems, as background for the present patent, the teachings of the following United States patents are incorporated herein by reference thereto.

U.S. Pat. No. 4,904,027 by Skantar and Sanders: DIGITAL AIR BRAKE CONTROL SYSTEM.

U.S. Pat. No. 5,192,118 by Balukin, Newingham and Jerina: ELECTRO-PNEUMATIC LOCOMOTIVE BRAKE CONTROL SYSTEM.

U.S. Pat. No. 5,222,788 by Dimsa and Jenets: MICROPROCESSOR BASED ELECTRO-PNEUMATIC LOCOMOTIVE BRAKE CONTROL SYSTEM HAVING BRAKE ASSURANCE CIRCUIT.

Each of these patents is assigned to the assignee of the present invention.

SUMMARY OF THE INVENTION

The present invention provides method and apparatus for measuring the flow rate of a fluid such as air in a fluid pressure communication conduit which, at certain known times, carries zero flow.

A section is provided in the fluid pressure communication conduit which introduces local variations in the flow path. These flow path variations cause local variations of pressure whenever fluid flows through the conduit.

Transducers are provided to measure the local pressures, and convert them into electrical signals. The fluid flow rate is calculated based on the electrical signals from the transducers, and including a correction for drift of the transducers.

When the conduit is not carrying fluid flow, a signal is generated which indicates that condition. At that time, signals from the transducers are used to obtain information regarding the drift of the transducers. One or more signals indicative of the drift of the transducers are obtained, and stored for later use when fluid flow occurs, and a measurement of fluid flow is required.

The invention may use a computer to calculate the fluid flow rate based on the signals from the transducers, and signals indicative of the drift of the transducers.

A signal indicative of the drift of the transducers is obtained whenever the fluid flow is reduced to zero, and a signal indicating the condition of zero fluid flow is provided. The signal indicative of the drift of the transistors is stored for use when fluid flow occurs, and a correction for drift is needed.

OBJECTS OF THE INVENTION

The principal object of the invention is to provide an automatic system for correcting for errors in measurement of fluid flow in a conduit caused by drift of transducers. For the case of a locomotive which, when it is used as a lead locomotive, supplies compressed air to the brake line of the train, the object is to obtain a correction for the drift of transducers used to measure the flow rate of air supplied to the brake line. This is done whenever the locomotive is taken out of service as a lead locomotive. The invention provides for this to be accomplished automatically, without the intervention of maintenance personnel.

A further object is to compare the correction which is required with an offset error threshold value to determine whether the correction is excessive. In the event that the correction exceeds the offset error threshold value, an offset error signal is generated. This may be displayed as a warning to the engineer of the locomotive, and may also be used for control purposes.

DESCRIPTION OF THE INVENTION

Figure 1:
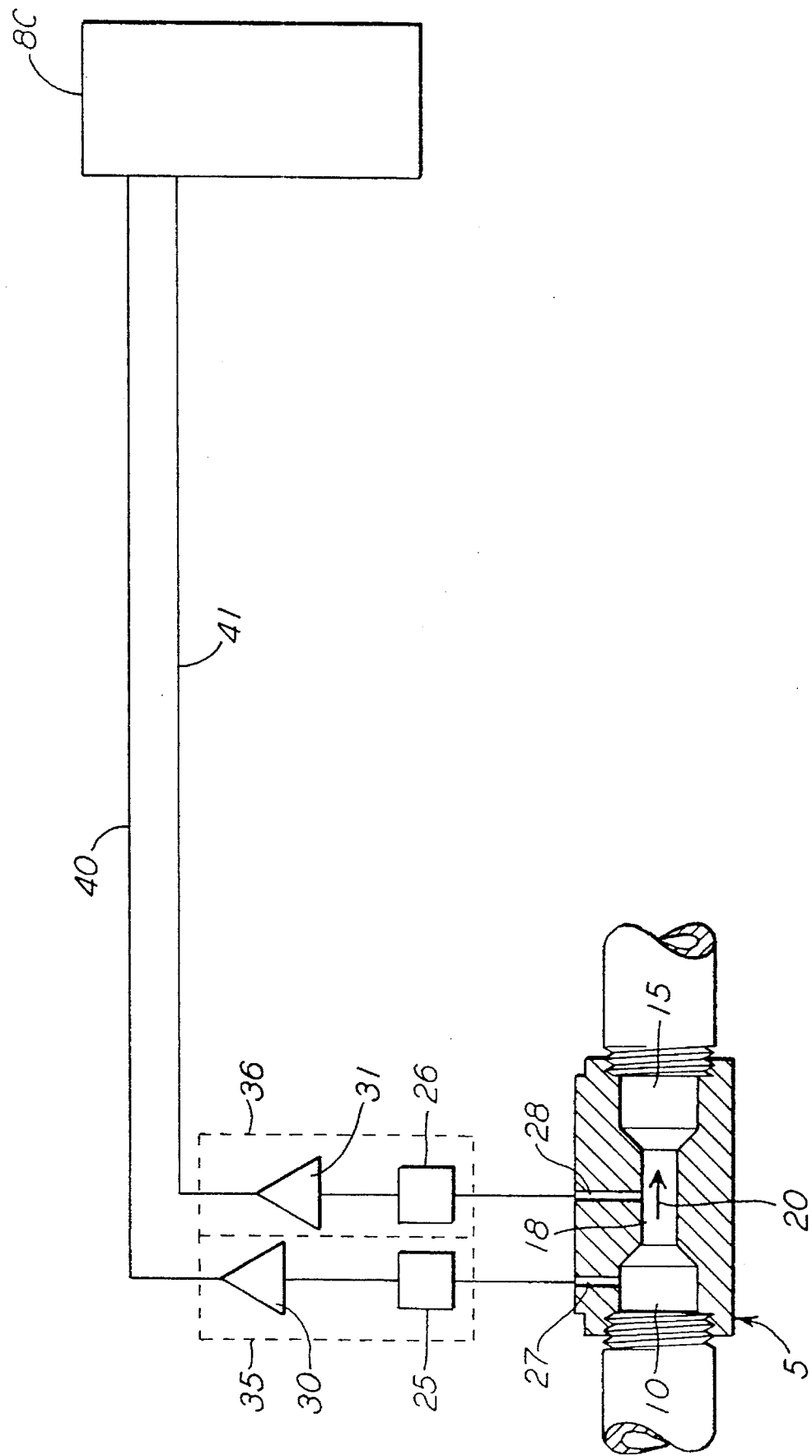
FIG. 1 shows a prior art system for measuring the flow of charging air to the brake pipe of a locomotive.

In each of the figures, element 5 is a flow block, which is a portion of the fluid flow conduit having a variation of flowpath. Fluid enters this element at 10 and exits at 15. The fluid flow direction is indicated by the arrow 20. The element has a variation of flowpath, which in these figures, is indicated as a reduction of cross-sectional area. The region having the reduced cross-sectional area is indicated as 18.

In each of the figures, two ports for obtaining pressure are shown. These are denoted 27 and 28. In each of the figures, 1 and 2, two pressure transducers are shown. These are indicated generally as 35 and 36. Element 25 is a sensor which measures the pressure at port 27, and element 26 is a sensor which measures the pressure at port 28. Signal conditioning electronics are shown in these transducers as elements 30 and 31.

Figure 3:
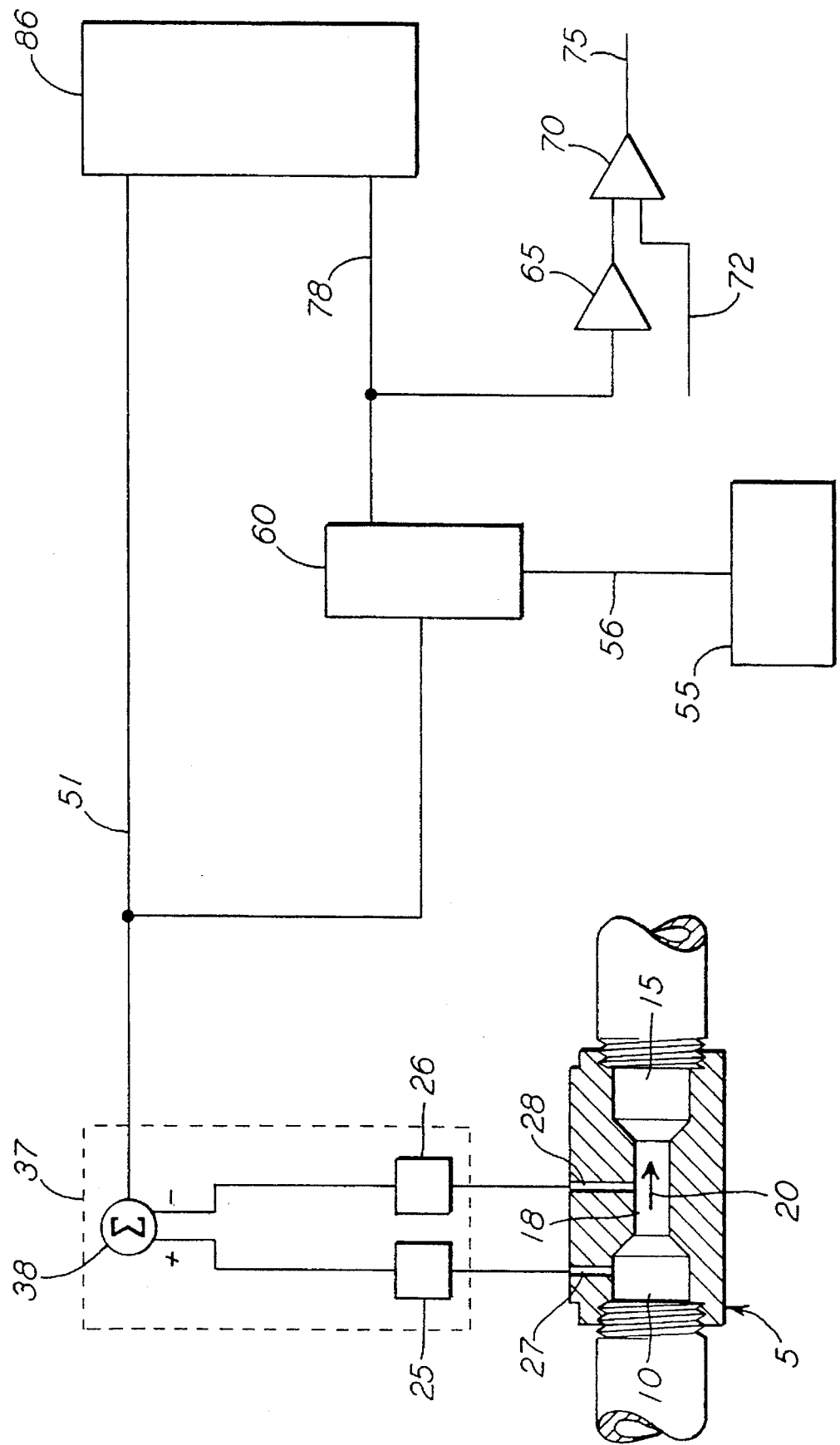
FIG. 3 shows an embodiment of the present invention in which a differential pressure transducer is used to obtain a difference between two pressures obtained at two points in the conduit where variations are introduced into the flow path. Means are provided for correcting for drift of the differential pressure transducer during times when the fluid flow is zero.

In FIG. 3, element 37 is a differential pressure transducer. This is illustrated as having pressure sensing elements, 25 and 26, and summing means 38, which provides a value for the difference between the two signals. Summing means 38 also has a signal conditioning function.

In FIG. 1, the prior art, 40 and 41 denote conduction lines which carry signals indicative of pressure from the transducers 35 and 36. Element 80 is a computer in which numerical values are obtained for the pressures, and the pressures are subtracted to obtain a pressure difference. The square root of the pressure difference is then calculated and this is used as a measure of the flow through the flow block 5 of the fluid flow conduit. In this prior art system, correction for drift of the transducers 35 and 36 is accomplished as a maintenance step by adjusting potentiometers associated with the signal-conditioning electronics, elements 30 and 31.

Figure 2:
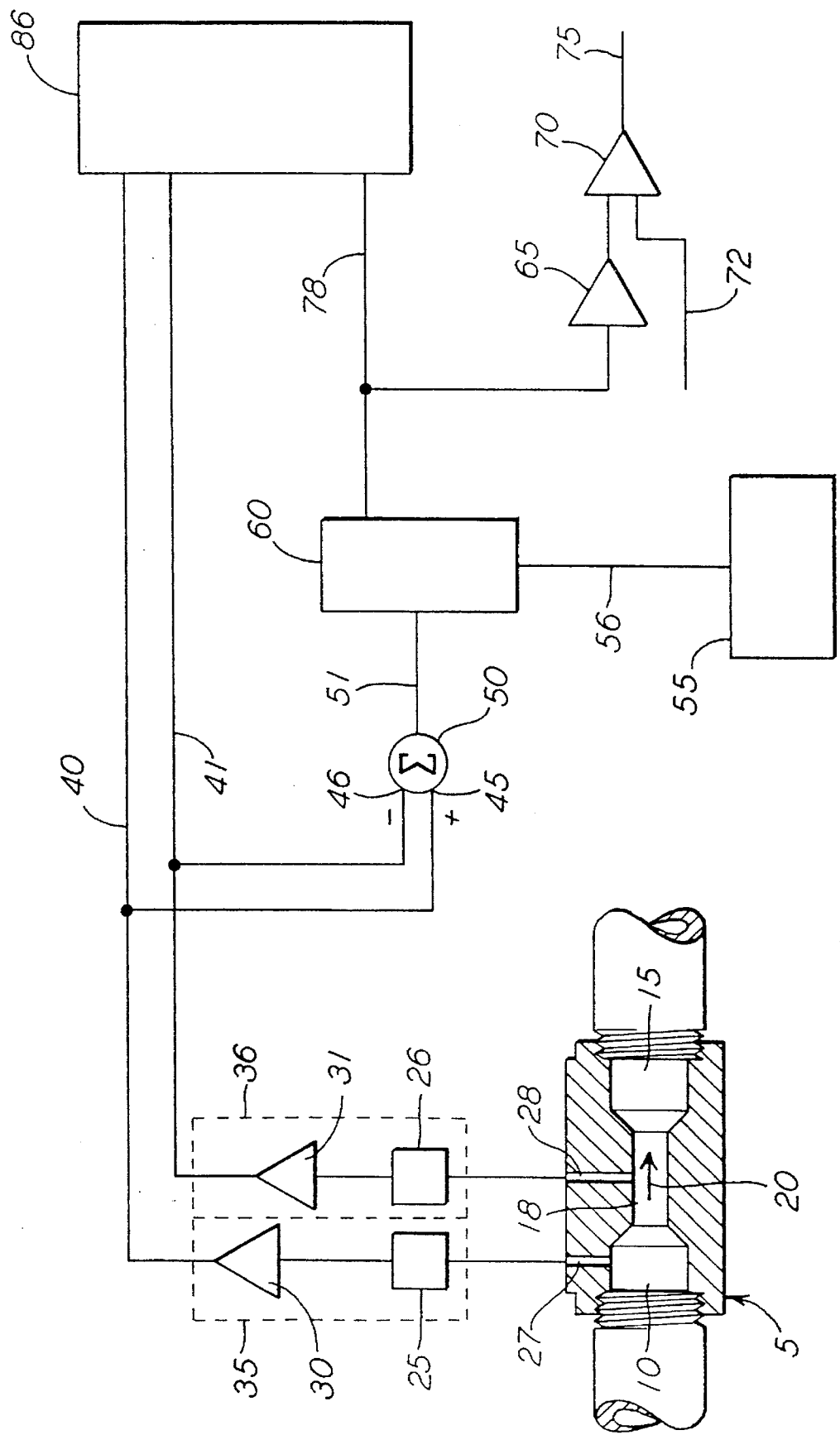
FIG. 2 shows the present invention for measuring the flow of fluid in a conduit, such as the line which supplies charging air to the brake pipe of a locomotive, with provision for capturing a value for drift of the transducers during times when the fluid flow is zero.

FIG. 2 shows the present invention. Elements 40 and 41 are conduction lines which carry signals indicative of pressure from the transducers 35 and 36. These lines enter the computer 85 where flow is calculated. This figure also shows means for correcting for transducer drift. Signals are conveyed by conduction lines 40 and 41 to input terminal 45 and inverted input terminal 46 of summing device 50 to obtain a signal on conduction line 51 indicative of the difference between the two transducer outputs. Element 55 is a means for generating a signal indicting that the flow through the flow block 5 is zero. When the present invention is applied to the charging air supply in a railroad brake system, this signal is the charge cutout signal. This signal is applied by conduction line 56 to element 60.

Element 60 is a sample and hold device. When the signal on line 56 indicates zero flow, the signal on conduction line 51 is saved in memory, and a corresponding signal is applied to conduction line 78. When the signal on conduction line 56 indicates that flow through flow block 5 has resumed, the sampling function of element 60 is stopped. The signal placed on conduction path 78 is then obtained from memory. This signal is indicative of the drift of the transducers.

The signal on conduction path 78, along with signals from the transducers, on conduction paths 40 and 41 are supplied to element 85. In element 85, the saved signal on conduction path 78, which indicates the transducer drift, is subtracted from the difference in the signals of the two transducers. This provides a corrected value for the pressure difference between the ports 27 and 28. The flow through the flow block 5 is then calculated from this corrected value.

FIG. 2 also shows means for generating an offset error signal if the correction for transducer drift exceeds an offset error threshold signal. The signal indicative of transducer drift on conduction line 78 passes through signal conditioning means 65 to an element 70 in which it is compared with an offset error threshold signal on conduction line 72. If the signal indicative of transducer drift exceeds the threshold signal, then an error signal is generated, and applied to conduction line 75. The signal on conduction line 75 may be used to control an indicator light or other warning device at the engineer's station in the locomotive. This signal may also be used to control other functions.

FIG. 3 shows an embodiment of the invention in which a differential pressure transducer is used in place of the two transducers, 35 and 36 of the preceding figures. The differential pressure transistor is denoted as element 37. Its function is indicated by sensor elements 25 and 26, which supply signals to positive and negative input terminals on the summing device 38. Summing device 38 produces a differential pressure signal on conduction path 51.

As in the embodiment shown in FIG. 2, element 55 generates a signal indicating the condition in which there is zero fluid flow through the flow block 5. This signal is supplied by conduction line 56 to element 60 which has a sample and hold function. When the signal on conduction line 56 indicates zero flow, the signal on conduction line 51 is saved in memory, and a corresponding signal is applied to conduction line 78. When the signal on conduction line 56 indicates that flow through flow block 5 has resumed, the sampling function of element 60 is stopped. The signal placed on conduction path 78 is then obtained from memory. This signal is indicative of the drift of the differential transducer, 37.

The signal on conduction line 78, along with the signal from the differential pressure transducer 37 on conduction line 51 is supplied as input to element 86. This element subtracts the signal from conduction line 78 from the signal on conduction line 51 to obtain a signal indicative of the actual pressure difference between pressure tap 27 and pressure tap 28, corrected by the saved value for drift from conduction line 78. In element 86, the fluid flow is then calculated from the corrected pressure difference between the taps 27 and 28.

The system shown in FIG. 3, like the system shown in FIG. 2, also shows means for generating an offset error signal if the correction for transducer drift exceeds an offset error threshold signal. The signal indicative of transducer drift on conduction line 78 passes through signal conditioning means 65 to an element 70 in which it is compared with an offset error threshold signal on conduction line 72. If the signal indicative of transducer drift exceeds the threshold signal, then an error signal is generated, and applied to conduction line 75. The signal on conduction line 75 may be used to control an indicator light or other warning device at the engineer's station in the locomotive. This signal may also be used to control other functions.

Although the preceding discussion of FIGS. 2 and 3 cite various independent elements such as 55, 60, 85 and 86, a person skilled in the art will recognize that these elements may be incorporated in a single device. Element 55, generates a signal indicating that flow through the flow block 5 is zero. Element 60, the sample and hold device, samples the difference signal from the transducers. If the zero-flow signal is activated, it places this value in memory. If the zero-flow signal is not activated, it obtains the last value placed in memory, and passes that information on to element 80 or 86 where the flow is calculated. All of these elements, 55, 60, 80, and 86, and the conduction line 78 may all be incorporated into a computer. In like manner, the summing device, 50, may also be incorporated in the computer. Although the signals originating in the transducers are analog signals, they may be converted to digital signals for subsequent processing, storage in memory, etc.

In a first aspect, the invention provides a method of measuring the rate of fluid flow in a fluid pressure conduit which, at certain known times, carries zero flow. Local variations are introduced into the flow path of the conduit to produce local pressures at various locations, which can be used to measure the fluid flow. The variations of flowpath may be changes in the cross-sectional area of the flowpath such as the area changes in an orifice or a venturi. Local pressure variations may be caused by inertial effects in the flowing fluid, or by pressure losses due to fluid friction.

Pressures are measured at two or more locations by means of pressure transducers or by one or more differential pressure transducers.

For a system which, at certain known times, is taken out of service, a method is provided for correcting for errors due to drift of the transducers. A signal is provided which indicates that the fluid flow has been stopped. It is desirable for the pressure in the conduit to remain at or near the pressure it has during normal operation, even though there is no fluid flow. When the signal indicating that the flow has been stopped is activated, a measurement of the transducer outputs is obtained. This is taken as an indication of the drift of the transducer(s). This value is stored in memory, and used subsequently when fluid flow is resumed, and a measurement of fluid flow is required. The method provides for this to occur automatically, without the intervention of maintenance personnel.

In a second aspect, the invention provides a method for providing a warning that the drift of the transducers has exceeded acceptable limits. This is done by comparing the signal indicating drift of the transducers with an offset error threshold signal to determine whether the drift signal exceeds the threshold signal. If it does, then an offset error signal is generated which indicates this condition.

The plurality of pressures used in this method may be two pressures. Two transducers may be used to measure these two pressures, or a single differential transducer may be used. The differential pressure transducer provides a single signal indicating the difference between the two pressures.

An additional aspect of this invention is that for fluid flow conduits having such a size, flow rate, fluid density and low viscosity that the flow is turbulent, the flow rate may be calculated based on the square root of the pressure difference, multiplied by a constant.

In a more particular aspect, the invention provides a method for measuring the flow rate of charging air supplied to the brake pipe supply valve in a locomotive. In this case, the signal that fluid flow has been stopped is a charge cutout command given when the locomotive is no longer in service as a lead locomotive.

For the case of the air brake charging system of a locomotive, an additional aspect of the invention is a method to provide a warning signal when the correction for transducer drift exceeds a predetermined amount, which is an offset error threshold signal. The warning signal may be displayed at the engineer's console, and can be used by maintenance personnel to determine whether recalibration or replacement of transducers is required.

In a further aspect, the invention provides a system for measuring the fluid flow rate in a fluid pressure communication conduit which, at certain known times, carries zero flow. The system comprises a flow block, which is a portion of the conduit in which local variations are introduced in the flowpath. The local variations of flowpath cause local pressure variations which are indicative of the amount of fluid flow. The system has a plurality of pressure transducers, or at least one differential pressure transducer to obtain at least one signal indicative of local pressures in the flow block.

The system also has a device for generating a signal which indicates that there is zero flow in the conduit. A sample and hold device is provided, responsive to that signal, to obtain the difference between the transducer outputs when there is no fluid flow. This information is stored in memory for use when fluid flow is resumed. When that occurs, and the signal indicating zero flow is removed, the value of the transducer signal difference saved in memory is used to provide a correction for drift of the transducers. This system provides a major reduction in the errors due to drift of transducers, when the fluid flow is measured.

The system may further include means for comparing the amount of transducer drift with a predetermined offset error threshold value to determine whether the amount of transducer drift has become excessive. Means are provided for generating a predetermined offset error threshold signal, and means are provided for comparing the magnitude of the transducer drift with the offset error threshold signal. If the magnitude of the transducer drift exceeds the offset error threshold signal, then an offset error signal is generated.

A further aspect of the invention is that the fluid flow may be measured by using two pressures obtained from local regions of the flow block. Two transducers may be used to measure these two pressures, or a single differential pressure transducer may be used to obtain the difference between the two pressures.

The system includes means for calculating fluid flow based on the pressure differences. For fluid flow conduits having such a size, flow rate, fluid density and low viscosity that the flow is turbulent, the flow rate may be calculated based on the square root of the pressure difference, multiplied by a constant. A digital computer may be used for this purpose.

The flow block which has the local variations in flow path may have a reduction in the flow area, as, for example, in an orifice, or a venturi.

The system of this invention may be applied to a locomotive in the system which supplies charging air to the brakepipe of the railroad air brake system. For this case, the flow block is placed in the line leading from the charging air reservoir tank to the valve which admits air to the brakepipe.

For this invention as applied to a locomotive, the signal which indicates that fluid flow through the conduit is zero is the charge cutout signal, which is activated whenever the locomotive is out of service as a lead locomotive.

In a further aspect, for the locomotive application, the offset error signal may be used to provide a warning at the engineer's console.

In an additional aspect, this invention provides apparatus for measuring the fluid flow rate in a fluid pressure conduit which, at certain known times, carries zero flow. The system includes a flow block which introduces local variations in the flow path which provide pressure variations having a relationship indicative of fluid flow. The system includes transducers which measure the pressures in the flow block.

The system includes means for generating a charge cutout signal during the times when the fluid flow is known to be zero. During these times, means responsive to the charge cutout signal obtain difference signals from the transducers which are due to drift of the transducers. This information, indicative of the drift of the transducers, is stored in computer memory for subsequent use when fluid flow is resumed, and the charge cutout signal is deactivated. The computer then calculates the fluid flow, correcting for drift of the transducers.

The presently-preferred embodiment of this invention is to the airbrake charging system of a locomotive. A compressor in the locomotive supplies air to a main reservoir tank. Air flows from this tank through a conduit to a valve which admits air to the brakepipe which supplies air to the brakeline of the air brake system. In the conduit which leads to the valve, a flow block is placed. This has a reduction of cross-sectional area which causes local pressure variations. A pressure tap is provided upstream of the region of reduced cross-sectional area, and a second tap is provided at a downstream position in the region of reduced cross-sectional area. These positions for the taps are suggested in the figures.

Two transducers may be used to generate electrical signals indicative of these pressures, or a single differential pressure transducer may be used to obtain the difference between the pressures.

It is preferred that in the flow block, the variations of cross-sectional area be rather moderate. This is because to supply sufficient air to the valve which supplies the brakepipe, a known minimum cross-sectional area is required.

In this preferred embodiment, the signal indicating that flow is zero is the charge cutout signal, which is supplied by a computer. Likewise, the calculation of flow involves the use of analog-to-digital converters to convert analog signals from the transducers to digital signals in the computer. The sample and hold function is embodied in a computer routine which is called periodically. This routine is responsive to the charge cutout signal. If the charge cutout signal is in effect, it obtains a value for the differential pressure, and places that value in memory. Later, when the charge cutout signal is removed, it obtains the differential pressure signal from the value in memory. The computer than subtracts this value from the pressure difference sensed by the transducers, to obtain a pressure difference corrected for transducer drift. The computer then takes the square root of this value and multiplies it by a constant to obtain a value for the airflow being supplied to the brakepipe.

While a presently preferred embodiment and various alternatives have been described above, with reference to the drawings, it should be understood that various other adaptations and modifications of the invention may be made by persons skilled in the art without departing from the spirit or scope of the appended claims.

I claim:

1. A method of measuring the fluid flow rate in a fluid pressure communication conduit which, at certain known times, carries zero flow, said method comprising the following steps:

(a) introducing local variations into a flow path of such fluid pressure communication conduit to produce a plurality of pressures at a plurality of locations, having a relationship indicative of such fluid flow rate;

(b) measuring said plurality of pressures at said plurality of locations using at least one pressure transducer to generate at least one signal indicative of said plurality of pressures;

(c) calculating such fluid flow rate using said at least one signal indicative of said plurality of pressures, and also using at least one signal indicative of a drift of said at least one pressure transducer; and (d) in response to a signal indicating that such fluid flow has been stopped, using said at least one signal indicative of said plurality of pressures to obtain at least one signal indicative of said drift of said at least one pressure transducer and storing said at least one signal indicative of said drift for subsequent use in step (c) when such fluid flow is resumed.

2. The method of claim 1 further comprising the step of comparing a magnitude of said at least one signal indicative of said drift of said at least one pressure transducer with an offset error threshold signal to generate an offset error signal if said magnitude exceeds said offset error threshold signal.

3. The method of claim 1 wherein said plurality of pressures is two pressures.

4. The method of claim 3 wherein said at least one transducer is two transducers, producing two signals indicative of pressure.

5. The method of claim 3 wherein said at least one transducer is one differential transducer, producing one signal indicative of a difference between said two pressures.

6. The method of claim 3 wherein flow is calculated based on a square root of said difference between said two pressures.

7. The method of claim 1 wherein said local variations in said flow path are variations in an area transverse to flow in such fluid pressure communication conduit.

8. The method of claim 1 wherein such fluid is compressed air, and such fluid pressure communication conduit is a brake pipe supply line in a locomotive, said brake pipe supply line leading to a brake pipe supply valve of a railroad air brake system, and wherein said signal indicating that such fluid flow has been stopped is a charge cutout command given when said locomotive is no longer in service as a lead locomotive.

9. The method of claim 2 wherein such fluid is compressed air, and such fluid pressure communication conduit is a brake pipe supply line in a locomotive, said brake pipe supply line leading to a brake pipe supply valve of a railroad air brake system, and wherein said signal indicating that such fluid flow has been stopped is a charge cutout command given when said locomotive is no longer in service as a lead locomotive, and wherein said offset error signal is used to provide a warning of excessive transducer drift to the engineer of said locomotive.

10. A system for measuring the fluid flow rate in a fluid pressure communication conduit which, at certain known times, carries zero flow, said system comprising:

(a) a portion of such fluid pressure communication conduit having local variations in a flow path to produce a plurality of pressures at a plurality of locations, having a relationship indicative of such fluid flow rate;

(b) at least one pressure transducer connected to receive as inputs said plurality of pressures obtained at said plurality of locations, and to generate at least one signal indicative of said plurality of pressures;

(c) means for generating a charge cutout signal which is activated when such fluid pressure communication conduit carries zero flow;

(d) means activated by said charge cutout signal to obtain at least one signal indicative of a drift of said at least one pressure transducer and for storing said at least one signal indicative of said drift of said at least one pressure transducer; and (e) means for calculating such fluid flow rate based on said at least one signal indicative of said plurality of pressures and said at least one signal indicative of said drift of said at least one pressure transducer, and for generating a signal indicative of such fluid flow rate.

11. The system of claim 10 further comprising:

(f) means for supplying at least one offset error threshold signal; and (g) means for comparing a magnitude of said at least one signal indicative of said drift of said at least one pressure transducer with said at least one offset error threshold signal to generate an offset error signal.

12. The system of claim 10 wherein said plurality of pressures is two pressures.

13. The system of claim 12 wherein said at least one transducer is two transducers, producing two signals indicative of pressure.

14. The system of claim 12 wherein said at least one transducer is one differential transducer, producing one signal indicative of the difference between said two pressures.

15. The system of claim 12 further comprising means for calculating such fluid flow rate based on the square root of the difference between said two pressures.

16. The system of claim 10 wherein said local variations in said flow path are variations in an area transverse to the flow in such fluid pressure communication conduit.

17. The system of claim 10 wherein such fluid is compressed air, and such fluid pressure communication conduit is a brake pipe supply line leading to a brake pipe supply valve of a railroad air brake system.

18. The system of claim 10 wherein such fluid is compressed air, and such fluid pressure communication conduit is a brake pipe supply line in a locomotive, said brake pipe supply line leading to a brake pipe supply valve of a railroad air brake system, and wherein said charge cutout signal is activated when said locomotive is no longer in service as a lead locomotive.

19. The system of claim 11 wherein such fluid is compressed air, and such fluid pressure communication conduit is a brake pipe supply line in a locomotive, said brake pipe supply line leading to a brake pipe supply valve of a railroad air brake system, and wherein said charge cutout signal is activated when said locomotive is no longer in service as a lead locomotive, and wherein said offset error signal is used to provide a warning of excessive transducer drift to the engineer of said locomotive.

20. A system for measuring the fluid flow rate in a fluid pressure communication conduit which, at certain known times, carries zero flow, said system comprising:

(a) a portion of such fluid pressure communication conduit having local variations in a flow path to produce a plurality of pressures at a plurality of locations, having a relationship indicative of such fluid flow rate;

(b) at least one pressure transducer connected to receive as inputs a plurality of pressures obtained at said plurality of locations, and to generate at least one signal indicative of said plurality of pressures;

(c) means for generating a charge cutout signal which is activated when such fluid pressure communication conduit carries zero flow;

(d) means activated by said charge cutout signal to obtain at least one signal indicative of a drift of said at least one pressure transducer and for storing said at least one signal indicative of said drift of said at least one pressure transducer; and (e) a computer programmed to calculate such fluid flow rate based on said at least one signal indicative of said plurality of pressures and said at least one signal indicative of said drift of said at least one pressure transducer, and for generating a signal indicative of such fluid flow rate.

* * * * *

UNITED STATES PATENT AND TRADEMARK OFFICE
CERTIFICATE OF CORRECTION

PATENT NO. : 5,563,353
DATED : October 8, 1996
INVENTOR(S) : Vincent Ferri

It is certified that error appears in the above-identified patent and that said Letters Patent is hereby corrected as shown below:

Column 4, line 10, please delete "indicting" and insert --indicating--.

Column 8, line 6, please delete "than" and insert --then--.

Signed and Sealed this

Eighteenth Day of August, 1998

Attest:

BRUCE LEHMAN

Attesting Officer          Commissioner of Patents and Trademarks